United States Patent

Smith

[15] 3,705,203
[45] Dec. 5, 1972

[54] METHOD FOR PURIFYING BIPHENYL
[72] Inventor: William E. Smith, Midland, Mich.
[73] Assignee: The Dow Chemical Company, Midland, Mich.
[22] Filed: Nov. 23, 1970
[21] Appl. No.: 92,317

[52] U.S. Cl. ..........................260/674 R, 260/524 R
[51] Int. Cl. ...............................................C07c 7/00
[58] Field of Search..............................260/674, 524

[56] References Cited

UNITED STATES PATENTS

| | | | |
|---|---|---|---|
| 1,590,965 | 6/1926 | Downs | 260/674 |
| 2,771,491 | 11/1956 | Conner | 260/674 |
| 3,161,693 | 12/1964 | Serres et al. | 260/524 |
| 3,183,279 | 11/1965 | Mills et al. | 260/674 |

Primary Examiner—Delbert E. Gantz
Assistant Examiner—C. E. Spresser
Attorney—Griswold & Burdick, J. Roger Lochhead and Herbert D. Knudsen

[57] ABSTRACT

Biphenyl contaminated with methylbiphenyls may be purified by heating the crude biphenyl to a melt, oxidizing the methylbiphenyls to their corresponding acids by passing air or oxygen through the melt, and removing the acids formed through distillation.

2 Claims, No Drawings

METHOD FOR PURIFYING BIPHENYL

BACKGROUND OF THE INVENTION

The hydrodealkylation of aromatic hydrocarbons may produce a biphenyl by-product which is contaminated with alkylarenes such as naphthalene, methylnaphthalenes, diphenylmethane, diphenylethane and, principally, methylbiphenyls. To purify this crude biphenyl by distillation is very difficult due to the close boiling points of the components.

SUMMARY OF THE INVENTION

It has now been found that biphenyl containing methylbiphenyl and other alkylarenes may be purified by heating the crude biphenyl to a melt, generally a temperature of about 100° to 200° C. being sufficient, passing enough air or oxygen through the melt to oxidize substantially all the methylbiphenyls to their corresponding phenylbenzoic acids, and removing the acids by distillation, thereby resulting in a more pure biphenyl. The above method also removes other alkylarene impurities.

Air or oxygen may be used, an excess based on the amount of impurities present being suitable.

Pressure is not critical, atmospheric or superatmospheric pressure being suitable. A sufficient amount of time for substantially all the methylbiphenyls to be oxidized is desirable.

SPECIFIC EMBODIMENTS 5.0 Grams of crude biphenyl was placed in a test tube, the tube placed in boiling water and an excess of air blown through the melt for 2.5 hours. The results, as analyzed by gas-liquid chromatography, were as follows:

| Impurities in Crude Sample | Before Reaction (ppm) | After Reaction (ppm) |
| --- | --- | --- |
| Methylbiphenyls | 6250 | 1250 |
| Naphthalene | 250 | 100 |
| Methylnaphthalene | 1100 | 200 |
| Diphenylmethane | 200 | 100 |
| Diphenylethane | 800 | 100 |
| Total | 8600 | 1750 |

I claim:

1. A method for purifying biphenyl contaminated with methylbiphenyls which comprises heating the crude biphenyl to a melt, passing sufficient air or oxygen through the melt to oxidize substantially all the methylbiphenyls present to their corresponding acids and separating the oxidation products through distillation, thereby resulting in a more pure biphenyl.

2. The process of claim 1 wherein the crude biphenyl is heated to a temperature of about 100° to 200° C.

* * * * *